Patented July 7, 1942

2,288,992

UNITED STATES PATENT OFFICE 2,288,992

TEXTILE PRINTING PASTE

Norman S. Cassel, Ridgewood, N. J., assignor to Interchemical Corporation, New York, N. Y., a corporation of Ohio No Drawing. Application July 13, 1939,
Serial No. 284,212

6 Claims. (Cl. 8—70)

This invention relates to the art of textile printing, and is directed particularly to new textile printing pastes comprising cellulose ether solutions containing water solutions of dyestuffs or dyestuff ingredients capable of producing permanent dyeings on fabrics, emulsified therein.

The conventional method of textile printing involves the application to a textile fabric of a dyestuff, or an ingredient of a dyestuff, in water solution, by means of an intaglio cylinder. In order to get the dyestuff solution thick enough to remain in the cells of the printing cylinders, and to remain in place when applied to the fabric, water-soluble thickening agents such as British gum, starch and the like are used. More recently, wetting agents have been added to the pastes to improve their printing properties. After printing, the dyes are set by various means so that they become water-insoluble, and the fabric is washed to remove the water-soluble thickeners.

Certain difficulties are encountered with these conventional dyestuff pastes. Since the fabrics printed are rather water-absorbent, prints made with water solutions, even when made viscous with the water-soluble thickeners, tend to spread out slightly from the point of application, a phenomenon known as flushing. As a result, the lines in the engraving may become somewhat blurred, and very fine lines close together may be entirely lost. When the viscosities of the pastes are adjusted so that no flushing occurs, the pastes become too thick to separate cleanly from the engravings. A compromise must always be made, so that effective separation occurs without substantial flushing; and the cylinders must be so prepared as to print most easily. Fine photogravure engravings have, as a consequence, never been used with conventional textile printing pastes, because their faithful reproduction of detail would not register on the fabric. Furthermore, the engravings used must be rather deep in order to get effective printing, and considerably more paste is used than is really necessary to produce most designs.

Another disadvantage of conventional dyestuff pastes is that a substantial quantity of dyestuff may be washed out with the thickeners. This is due partially to mechanical suspension of converted dyestuff in the film of thickener, partially to incomplete conversion of the dyestuff to the insoluble form, due to the trapping of the soluble dyestuff inside of the thickener film, and, in some cases, partially to actual dyeing of the thickener. This may represent a serious loss of dyestuff.

In my copending application, Serial Number 215,585, filed June 24, 1938, now United States Patent No. 2,202,283 of which this is a continuation-in-part, I have disclosed a means whereby these disadvantages may be overcome, and successful dyestuff printing can be done with photogravure and other relatively shallow engravings, with the retention of the complete detail of the photogravure cylinders, and the use of a minimum of dyestuff. As therein disclosed, this means comprises the preparation of dyestuff printing pastes by the emulsification of an aqueous solution of a dyestuff or a dyestuff component with a water immiscible bodying composition (preferably a solution of a film-forming thickener in a solvent), the dyestuff solution being in the discontinuous phase. The resultant emulsion, of optimum consistency for printing, is applied to a fabric, as with a conventional intaglio cylinder; the dyestuff is fixed on the fabric, and the fabric is then dried, with or without washing, depending on the dyestuff employed.

As the emulsion is applied to the cloth and the emulsion breaks, the dyestuff solution penetrates into the yarns of the fabric. Since the water phase and the bodying agent are mutually repellant, the non-aqueous phase prevents undue spreading of the aqueous phase. As a result, substantially no flushing occurs, and fine printing is obtained, which preserves the fine lines of a photogravure engraving even on materials which are as difficult to print as cotton flannels.

I have now discovered that unusually effective results in this type of dyestuff printing can be obtained by using solutions of cellulose ethers in hydrophobic organic solvents as the continuous phase of the emulsion, and particularly by using solutions of very small quantities of cellulose ethers in hydrophobe hydrocarbon solvents.

The ability of these cellulose ether solutions to stably emulsify large percentages of water containing large quantities of electrolytes, and their resistance to decomposition by strong alkalis and acids makes them highly desirable for general use, since they permit the use of dyestuffs which require acid or alkali to put them into solution, and likewise permit the incorporation of discharge agents in the printing pastes.

Still another advantage of these solutions is that they produce stable emulsions of proper printing consistency with such very small quantities of binder that no removal of the thickener is necessary, thus eliminating the conventional soaping operation. This not only affects an economy in the amount of material which must be used, but materially hastens the finishing operations.

The cellulose ether may be any one which is soluble in hydrophobe organic solvents, and is preferably one which yields solutions of high viscosity in low concentrations. High viscosity ethyl cellulose of the type used in ordinary lacquer work, having an ethoxy content of 47.5% to 49% and a viscosity of 200 centipoises or higher (as conventionally measured at 25° C., using a 5% solution of cellulose ether in a mixture of 80 toluol—20 ethanol) is particularly suitable for my purposes.

Any hydrophobe solvents may be used, but I prefer hydrocarbons because of their relatively low cost and resistance to acids and alkalis. The solvent should preferably be as volatile as is consistent with good printing practice, in order that as much as possible shall evaporate, so that it will have the least possible action on the final finishing operations.

As indicated above, I prefer to keep the amount of cellulose ether at a minimum, to facilitate the finishing operations; but enough material must be used to produce a stable emulsion. I have produced such emulsions with as low as 0.2% of high viscosity cellulose ether. I prefer to use not over about 2.0% of the ether to insure maximum ease of handling in the finishing operations, although higher percentages can be used. In order to get a paste of printing consistency, at least 20% of water is ordinarily required. In general, larger amounts, of the order of 40 to 60%, are used by preference.

The following are typical examples of my invention:

Example 1

| | Parts by weight |
|---|---|
| 241 centipose viscosity ethyl cellulose | .45 |
| Pine oil | .68 |
| Xylol | 13.85 |
| Solvesso #2 (hydrogenated petroleum hydrocarbon, boiling range 135–177° C.) | 14.27 |

Into this lacquer is stirred a mixture of—

| | Parts by weight |
|---|---|
| Rapidogen Red R solution (General Dyestuffs Corporation, U. S. Patent No. 1,882,560) | 13.50 |
| 50% caustic soda solution | 1.00 |
| Water | 56.52 |

This makes an exceptionally fine printing paste, which gives fine detail, and leaves practically no finish on the fabric.

Example 2

| | Parts by weight |
|---|---|
| 241 centipose ethyl cellulose | .40 |
| Pine oil | .21 |
| 302 xylol | 12.09 |
| 304 Solvesso #2 | 12.30 |

Into this lacquer is stirred:

| | Parts by weight |
|---|---|
| Ponsol Blue G. D. double paste (du Pont—Schultz 1234) | 10.00 |
| Glycerine A (General Dyestuffs Corporation) | 4.00 |
| Glycerine | 6.00 |
| Potash | 9.00 |
| Rongalite (formaldehyde sodium sulfoxylate) | 8.00 |
| Water | 38.00 |

This vat dyestuff gives an exceptionally fast print which requires no washing to remove thickener.

Example 3

| | Parts by weight |
|---|---|
| High viscosity benzyl cellulose | 2.0 |
| Toluol | 41.4 |
| Ethanol | 1.6 |
| Pine oil | 15.0 |
| Water | 30.0 |
| Rapidogen Red GS—Double sol. (U. S. Patent No. 1,882,561) | 10.00 |

Other materials capable of conversion into fast fabric dyestuffs can be used to replace those shown, which are among the most difficult to print because of the chemicals needed to keep them in solution. The vat dyestuff of Example 2 is set in conventional fashion, by oxidation; the "Rapidogen" dyestuff of Examples 1 and 3 is set by acid treatment in conventional fashion. The use of my printing pastes permits this acid treatment to be effected in a wet way, thus eliminating the necessity for a special dry acid ager. The ordinary azo color salts, which are printed on a fabric containing a base, and are coupled on the fabric, can also be printed easily with my pastes.

Another advantage of my invention is that the printed material is immediately ready for the chemical treatment used to fix the dye, without further drying before treatment, as is required with conventional pastes. This makes possible a short, substantially continuous process of printing and fixing not heretofore attainable, since the steps of drying before fixing and removal of the thickener are eliminated.

Other advantages of my invention will occur to those skilled in the art, and many modifications thereof can be made without departing from the scope of the invention, which is defined in the claims.

I claim:

1. A textile printing paste comprising an emulsion having a discontinuous phase comprising an aqueous solution of a water soluble textile coloring component, and a continuous phase comprising a solution of a water-insoluble cellulose ether in a volatile hydrophobe organic solvent.

2. A textile printing paste comprising an emulsion having a discontinuous phase comprising an aqueous solution of a water soluble textile coloring component, and a continuous phase comprising a solution of an ethyl cellulose in a volatile hydrophobe organic solvent.

3. A textile printing paste comprising an emulsion having a discontinuous phase comprising an alkaline aqueous solution of a water soluble textile coloring component, and a continuous phase comprising a solution of an ethyl cellulose in a volatile hydrophobe organic solvent.

4. A textile printing paste comprising an emulsion having a discontinuous phase comprising an aqueous solution of a water soluble textile coloring component, and a continuous phase comprising a solution of an ethyl cellulose in a volatile hydrocarbon solvent, the ethyl cellulose being present in said printing paste in an amount not exceeding about 2% by weight.

5. A textile printing paste comprising an emulsion having a discontinuous phase comprising an aqueous solution of an alkali and a water soluble textile coloring component, and a continuous phase comprising a solution of an ethyl cellulose in a volatile hydrocarbon solvent, the ethyl cellulose being present in said printing paste in an amount not exceeding about 2% by weight.

6. The method of decorating or coloring textiles which comprises applying an aqueous solution of a textile coloring component to a textile fabric as a discontinuous phase dispersed in a continuous phase comprising a water insoluble cellulose ether dissolved in a volatile hydrophobe organic solvent, and immediately passing the fabric into a chemical treater to fix the color on the fabric.

NORMAN S. CASSEL.